(12) United States Patent
Sakamoto

(10) Patent No.: US 6,479,122 B2
(45) Date of Patent: Nov. 12, 2002

(54) GLASS SUBSTRATE FOR AN OPTICAL DISK AND A MANUFACTURING METHOD THEREOF

(75) Inventor: Yasuaki Sakamoto, Kyoto (JP)

(73) Assignee: itrix Corporation, Tokyo (JP)

( * ) Notice: Subject to any disclaimer, the term of this patent is extended or adjusted under 35 U.S.C. 154(b) by 28 days.

(21) Appl. No.: 09/750,103

(22) Filed: Dec. 29, 2000

(65) Prior Publication Data

US 2002/0086130 A1 Jul. 4, 2002

(51) Int. Cl.⁷ .................................................. B32B 3/02
(52) U.S. Cl. ...................... 428/64.1; 428/64.4; 428/426; 65/66
(58) Field of Search ............................... 428/64.1, 64.4, 428/426, 913; 430/270.11, 495.1, 945; 427/164, 165; 65/66

(56) References Cited

U.S. PATENT DOCUMENTS

| | | | | |
|---|---|---|---|---|
| 5,498,445 A | * | 3/1996 | Steiner | 427/162 |
| 5,843,626 A | * | 12/1998 | Ohta | 430/320 |
| 2001/0009103 A1 | * | 7/2001 | Takagi | 65/102 |
| 2002/0009602 A1 | * | 1/2002 | Kitayama | 428/432 |

* cited by examiner

Primary Examiner—Elizabeth Mulvaney
(74) Attorney, Agent, or Firm—Crowell & Moring LLP

(57) ABSTRACT

A method of manufacturing a glass substrate for an optical disk using a press-mold formed of a super-hard material and having a surface of a prescribed roughness. A track pattern is formed in the surface of the glass substrate by inserting the substrate and a stamper containing track patterns into the press mold and pressing the substrate against the stamper. A film-like thermoplastic synthetic resin is disposed between the glass substrate and the stamper, and the glass substrate is heated to the distortion temperature point of glass.

4 Claims, 1 Drawing Sheet

GLASS SUBSTRATE FOR AN OPTICAL DISK AND A MANUFACTURING METHOD THEREOF

BACKGROUND OF THE INVENTION

1. Field of the Invention

The present invention relates to a glass substrate for an optical disk or the like that is used for storing digital data, such as audio and video computer data, and graphics data. The present invention particularly relates to a method for manufacturing the glass substrate and facilitating the formation of track patterns in the surface thereof.

2. Description of the Related Art

Optical disks and other disks have been conventionally formed of polycarbonate, acrylic, epoxy, olefin, and other resinous materials. However, such materials are affected by high temperatures and humidity, and they tend to change adversely over time. Disks formed of these materials also are limited in their storage capacity. Accordingly, glass, which is not affected by temperature in this way, has been introduced as a material for forming optical disks and the like.

In manufacturing disks with glass, a glass plate is molded using a fusion method or a float method. The glass plate is cut into a desired shape and annealed. The preformed glass plate is press-molded using a mold having a surface that has been formed with great precision. Next, the plate undergoes such processes as polishing and surface treatments. Subsequently, a laser process is conducted to form tracks (grooves) in the surface of the disk, completing the process of manufacturing a glass substrate for an optical disk.

As described above, tracks are formed in the surface of the glass substrate by performing a laser process thereon. Accordingly, expensive equipment is necessary to perform this process, thereby increasing production costs.

SUMMARY OF THE INVENTION

In view of the foregoing, one object of the present invention is to provide an easy and inexpensive method for manufacturing a glass substrate and forming track patterns in the surface thereof. This object and others will be attained by a method of manufacturing a glass substrate for an optical disk, the method comprising the steps of preparing a press-mold formed of a super-hard material and having a surface of a prescribed flatness; positioning a glass plate, a thermoplastic resin film, and a stamper containing a track pattern in the mold; and press-molding the glass plate with the track pattern of the stamper at the distortion temperature of glass. The prescribed flatness of the surface is 10 μm or less. The thickness of the thermoplastic resin film is 0.05–0.08 mm.

According to another aspect of the present invention, a glass substrate for an optical disk comprises a track pattern formed in the surface thereof by the above-described method.

DESCRIPTION OF THE PREFERRED EMBODIMENTS

Figure 1:
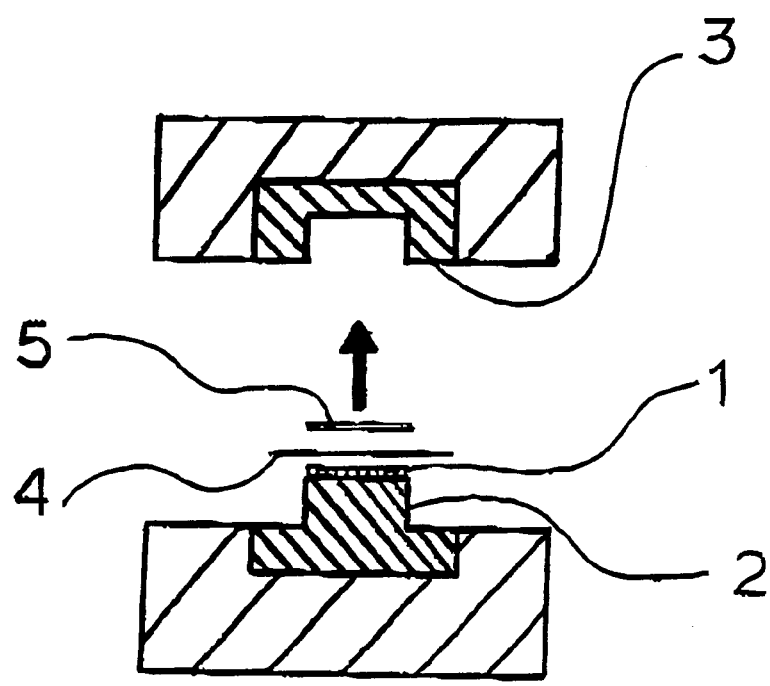
FIG. 1 is an explanatory diagram showing a glass substrate for an optical disk and a press-mold for forming the same.

A method for manufacturing a glass substrate for an optical disk according to a preferred embodiment of the present invention will be described while referring to the accompanying drawings.

FIG. 1 shows a glass substrate for an optical disk and a press-mold for forming the same. As shown in the diagram, the press mold includes a lower die 2 and an upper die 3. A glass disk 1 is placed on the lower die 2, on top of which are placed a film 4 and then a stamper 5. The glass disk 1 has been press-molded from a glass plate and has undergone a polishing process, a process to form a hole, chemical treatment of the surface, and the like.

In order to manufacture a glass substrate for an optical disk, the glass disk 1 is placed on the top surface of the lower die 2. The molded surfaces of the lower die 2 and upper die 3 have been processed to a surface finish having an Ra roughness of 10 μm or less. The glass disk 1 is heated to its distortion temperature point, which is 400–500° C., depending on the type of glass used. The film 4 is formed of a thermoplastic synthetic resin having a thickness of 0.05–0.08 mm. The film 4 serves to promote expansion of the glass and to increase the ability of the glass disk 1 to separate from the stamper 5 after pressing.

In order to manufacture a glass substrate for an optical disk, the glass disk 1 is placed on the top surface of the lower die 2. The molded surfaces of the lower die 2 and upper die 3 have been processed to a surface finish having an Ra roughness of 10 μm or less. The glass disk 1 is heated to its distortion temperature point, which is 400–500° C., depending on the type of glass used. The film 4 is formed of a thermoplastic synthetic resin having a thickness of 0.05–0.08 mm. The film 4 serves to promote expansion of the glass and to increase the ability of the glass disk 1 to separate from the stamper 5 after pressing. The surface of the stamper 5 that contacts the film 4 contains tracks for applying a pattern to the glass disk 1.

After the glass disk 1 is placed on the molding surface of the lower die 2, the film 4 and then the stamper 5 are placed in order on top of the glass disk 1. Subsequently, the glass disk 1, film 4, and stamper 5 are pressed together as the lower die 2 is raised. The pressure used in pressing at this time is 500–800 kg/cm$^2$. The duration of the press, including the hold time, is approximately 10 seconds. After pressing, the lower die 2 is lowered and the glass disk 1, now containing a track pattern on its surface, is removed. After it is removed, the glass disk 1 is gradually cooled for 15–20 minutes at 500–380° C. The glass disk 1 is then returned to room temperature to complete the production of the glass substrate for an optical disk.

There will now be described an example method for manufacturing a glass substrate for a digital video disc (DVD) having a diameter of about 120 mm, using the manufacturing method of the present invention.

A glass disk for a DVD having a diameter of 120 mm is set on the lower die 2, which has been heated to 445° C. The film 4 and the stamper 5 are placed on the glass disk and the lower die 2 is raised and pressed against the upper die 3, which has been heated to 420° C. The pressure used in pressing at this time is 600 kg/cm$^2$. The duration of the press, including the hold time, is 10 seconds. After pressing, the glass disk 1 is removed and gradually cooled for 15–20 minutes at 500–380° C. The glass disk 1 is then cooled to room temperature to complete the production of the glass substrate for a DVD. The precision of the track pattern formed on the glass substrate is equivalent to that formed using a laser process.

As described above, the manufacturing method of the present invention employs a mold having a molding surface of a high degree of flatness. A track pattern can be easily formed in the glass disk by inserting a glass disk, a stamper containing track patterns, and a film disposed therebetween into the mold and pressing the layers together. Accordingly, the laser process for forming a pattern on a glass substrate is no longer necessary, thereby eliminating the need for expensive equipment and lowering the costs for producing glass substrates for optical disks.

EXPLANATION OF NUMBERS IN THE DRAWINGS 1 glass disk
2 lower die
3 upper die
4 film
5 stamper

What is claimed is:

1. A method of manufacturing a glass substrate for an optical disk, the method comprising the steps of:

a. preparing a press mold formed of a super-hard material and having a surface of a prescribed flatness;
   b. positioning a glass plate, a thermoplastic resin film, and a stamper containing a track pattern in the mold; and
   c. press-molding the glass plate with the track pattern of the stamper at the distortion temperature of glass.

2. A method of manufacturing a glass substrate for an optical disk as recited in claim 1, wherein the prescribed flatness of the surface is 10 $\mu$m or less.

3. A method of manufacturing a glass substrate for an optical disk as recited in claim 1, wherein the thickness of the thermoplastic resin film is 0.05–0.08 mm.

4. A glass substrate for an optical disk, having a track pattern formed in the surface thereof by a stamper inserted with the glass substrate into a press-mold formed of a super-hard material and having a surface of a prescribed flatness.

* * * * *